United States Patent Office 2,783,233
Patented Feb. 26, 1957

2,783,233

10-HYDROXYALKALOIDS AND METHOD OF MAKING

Henry Rapoport and Satoru Masamune, Berkeley, Calif., assignors to The Regents of the University of California, Berkeley, Calif.

No Drawing. Application January 13, 1956, Serial No. 558,831

9 Claims. (Cl. 260—285)

This invention relates to, and in general has for its object, the provision of 10-hydroxymorphine, to the provision of a method of making such compound, and to the provision of certain intermediate 10-hydroxyalkaloids resulting from such method.

Although morphine is one of the most effective analgesics known, it is also toxic and overdoses of it can prove to be fatal. Therefore, for many years researchers have attempted to find less toxic derivatives of this drug, or substitutes therefor. We have found that 10-hydroxymorphine has a much higher safety ratio—the ratio of toxic dose to analgesic dose—than morphine.

Since cold chromic acid oxidation has been applied to codeine and a number of its derivatives, it was thought that the same general procedure could be readily applied to several additional alkaloids of the morphine group for the purpose of hydroxylating them at the 10-position. (See H. Rapoport and G. W. Stevenson, Journal of American Chemical Society, 76, 1796 (1954), and H. Rapoport and Satoru Masamune, ibid., 77, 6359, (1955).) While this reasoning proved to be correct with respect to neopine and $\Delta^7$-desoxycodeine, it proved to be entirely incorrect with respect to morphine, the most important compound of the group.

Before the oxidation procedure in question could be applied to morphine, we found it was necessary to find a suitable protecting group for the phenolic hydroxyl in order to prevent oxidation of the aromatic ring. Furthermore, such a group, in addition to being stable to acid and oxidation, had to be capable of being removable under mild conditions, since the hydroxylated molecule would then contain a secondary benzilic alcohol, a secondary allylic alcohol, and an alicyclic double bond.

General oxidation procedure

In carrying out the objects of our invention, all oxidations followed the general procedure set forth in the two literary references above referred to, but $O^3$-allyl-morphine was used as a starting material rather than morphine, for morphine, as above stated, is not suitable for this purpose.

To this end, a solution of chromic acid in 10 N sulfuric acid was added to a well-stirred solution of $O^3$-allyl-morphine in 1 N sulfuric acid maintained at 3°–5° C. For 12.7 g. of $O^3$-allylmorphine, 2000 ml. of 1 N sulfuric acid; 2.64 g. of chromic acid, and 132 ml. of 10 N sulfuric acid were used, and the addition was made over a six to eight-hour period from a capillary-tipped dropping funnel extending below the surface of the alkaloid solution. One hour after completion of the addition, sodium sulfite was added to destroy any excess oxidant. The solution was adjusted to pH 4–5 with sodium carbonate, and then it was made strongly alkaline with sodium hydroxide prior to extraction with a suitable solvent such as chloroform.

Preparation of $O^3$-allyl-10-hydroxymorphine

The oxidation of the 12.7 g. of $O^3$-allylmorphine and the extraction thereof with chloroform as above set forth left 8.2 g. of residue. This material was applied to an alumina column (6.5 x 8.0 cm.) using benzene-chloroform (7:3) and by gradually changing the solvent to 1:1, 3.6 g. (28 percent) of the starting material was recovered. Continued elution with chloroform gave 1.9 g. of $O^3$-allyl-10-hydroxymorphine (a new compound) which was then crystallized from ethyl acetate and sublimed at 120°/10 u; yield, 1.3 g. (10 percent), M. P. 137.5–139° C., $[\alpha]_D^{22}$ —100° (C, 0.85, ethanol).

*Analysis.*—Calcd. for $C_{20}H_{23}O_4N$: C, 70.4; H, 6.8. Found: C, 70.2; H, 6.7.

Preparation of crude 10-hydroxymorphine

A solution of 700 mg. (2.05 mmoles) of $O^3$-allyl-10-hydroxymorphine in 30 ml. of liquid ammonia was treated with 230 mg. (10 mmoles) of sodium in portions with stirring. The vigorous gas evolution soon subsided and a permanent blue color developed within about 10 minutes, after which 0.7 ml. of methanol was added and the now colorless solution was evaporated under a nitrogen stream and then in vacuo. Solution of the residue in water (1.8 ml.) was prepared, the adjustment of the pH of the solution of 8.3 with an acid, such as hydrochloric acid, and cooling gave 550 mg. of a yellow, crystalline precipitate which was extracted with acetone in a Soxhlet extractor for two days. The solid in the boiling flask plus the additional material obtained on concentrating the acetone was dissolved in 300 ml. of 50 percent aqueous ethanol and this solution was treated with 200 mg. of decolorizing carbon, filtered, and concentrated to dryness.

Preparation of triacetyl-10-hydroxymorphine

The resulting 490 mg. (79 percent yield) of 10-hydroxymorphine was purified further through the triacetyl derivative. Heating a solution of 1 g. of 10-hydroxymorphine in 35 ml. of acetic anhydride and 5 ml. of pyridine for seven hours at 100° C. and evaporating the solution to dryness in vacuo left a residue which was chromatographed on alumina (acid washed, 3.5 x 6 cm.). The chromatogram was developed with benzene and the elution was completed with benzene-chloroform (8:2 and 1:1). Crystallization from ethyl acetate gave 1.16 g. (82 percent yield) of triacetyl-10-hydroxymorphine, a new compound; M. P. 186–187° C., $[\alpha]_D^{22}$ —86.8° (C. 9.93, ethanol).

*Analysis.*—Calcd. for $C_{23}H_{25}O_7N$: C, 64.6; H, 5.9. Found: C, 64.5; H, 6.1.

Preparation of purified 10-hydroxymorphine

To obtain 10-hydroxymorphine, a solution of the triacetyl derivative in 0.5 N sodium hydroxide in 50 percent aqueous ethanol was heated under reflux overnight in a nitrogen atmosphere. The solution was concentrated in vacuo to one-sixth its volume, the pH was adjusted to 8.3, and the precipitated white, crystalline 10-hydroxymorphine was filtered from the cooled solution in 93 percent yield. It was washed with water, ethanol, and ethyl acetate and dried at 100° C. in vacuo; M. P. 325° C. with dec. after sintering at 230–240° C.; $[\alpha]_D^{21}$ —94.5 (C. 0.69, 2 N acetic acid).

*Analysis.*—Calcd. for $C_{17}H_{19}O_4N$: C, 67.8; H, 6.4. Found: C, 68.0; H, 6.7.

It should here be noted that the intermediate compounds $O^3$-allyl-10-hydroxymorphine and triacetyl-10-hydroxymorphine are new compounds, as well as the 10-hydroxymorphine, and that the utility of the former resides, among other things, in the fact that they serve as starting materials from which the 10-hydroxymorphine can be produced in accordance with our method. The latter compound is, of course, highly desirable in that it has a much higher safety ratio than morphine.

We claim:
1. A 10-hydroxyalkaloid selected from the group consisting of 10-hydroxymorphine, $O^3$-allyl-10-hydroxymorphine and triacetyl-10-hydroxymorphine.
2. 10-hydroxymorphine.
3. $O^3$-allyl-10-hydroxymorphine.
4. Triacetyl-10-hydroxymorphine.
5. The method of oxidizing $O^3$-allyl-10-hydroxymorphine comprising subjecting $O^3$-allylmorphine to cold chromic acid oxidation, wherein a solution of chromic acid in 10 N sulfuric acid is added to a well-stirred solution of $O^3$-allylmorphine in 1 N sulfuric acid maintained at 3–5° C. in the following proportions: for 10 ml. of $O^3$-allylmorphine, 500 ml. of 1 N sulfuric acid, 0.66 g. of chromic acid, and 33 ml. of 10 N sulfuric acid; wherein after the completion of said addition, sodium sulfite is added to destroy any excess oxidant, the pH of the solution is adjusted to pH 4–5 and then made strongly alkaline, and wherein the solution is extracted with a suitable solvent such as chloroform.
6. The method of preparing $O^3$-allyl-10-hydroxymorphine comprising subjecting $O^3$-allylmorphine to cold chromic acid oxidation in accordance with claim 5; applying the resulting residue to an alumina column using benzene-chloroform (7:3); and gradually changing the solvent to 1:1.
7. The method of preparing crude 10-hydroxymorphine comprising treating a solution of $O^3$-allyl-10-hydroxymorphine in liquid ammonia with sodium with stirring and permitting the resulting evolution of gases to subside; adding methanol to the solution and drying it to produce a residue; preparing an aqueous solution of said residue and adjusting its pH to 8.3; cooling said solution to produce a crystalline precipitate of crude 10-hydroxymorphine.
8. The method of producing triacetyl-10-hydroxymorphine comprising heating a solution of crude 10-hydroxymorphine in acetic anhydride and pyridine and evaporating the solution to dryness to produce a residue; chromatographing said residue on alumina and developing the chromatogram with benzene and completing the elution with benzene-chloroform.
9. The method of preparing 10-hydroxymorphine comprising preparing a solution of triacetyl-10-hydroxymorphine in sodium hydroxide in aqueous ethanol and heating said solution under reflux in an inert atmosphere; concentrating the solution and adjusting it pH to 8.3.

No references cited.